United States Patent [19]

Bradford et al.

[11] Patent Number: 5,338,825
[45] Date of Patent: Aug. 16, 1994

US005338825A

[54] POLYMER PREPARATION

[75] Inventors: Arleen M. Bradford; Petrus W. N. M. Van Leeuwen; Annetta M. Wullink-Schelvis, all of Amsterdam, Netherlands

[73] Assignee: Shell Oil Company, Houston, Tex.

[21] Appl. No.: 67,320

[22] Filed: May 25, 1993

[30] Foreign Application Priority Data

May 27, 1992 [EP] European Pat. Off. ........ 92201534.2

[51] Int. Cl.$^5$ ............................................. C08G 67/02
[52] U.S. Cl. .................................................. 528/392
[58] Field of Search ......................................... 528/392

[56] References Cited

U.S. PATENT DOCUMENTS 4,925,918 5/1990 Brown et al. .................... 528/392
5,214,126 5/1993 Driessen et al. .................. 528/392

FOREIGN PATENT DOCUMENTS 0181014 5/1986 European Pat. Off. .
0248483 12/1987 European Pat. Off. .

OTHER PUBLICATIONS

Ulrich Klabunde and Steven D. Ittel, *Nickel Catalysis For Ethylene Homo- And Co-Polymerization, Journal of Molecular Catalysis,* 61 (Jun. 1987) 123–134.

Jeffry S. Brumbaugh, Robert R. Whittle, Masood Parves and Ayusman Sen, *Insertion of Olefins into Palladium (II)–Acyl Bonds. Mechanistic and Structural Studies, Organometallics* Jun. 1990, 9, 1735–1747.

*Primary Examiner*—Maurice J. Welsh
*Assistant Examiner*—Shelley A. Dodson
*Attorney, Agent, or Firm*—James O. Okorafor

[57] ABSTRACT

A process for the preparation of copolymers which comprises reacting carbon monoxide and one or more ethylenically unsaturated compounds under polymerization conditions in the presence of a catalyst system comprising:

(a) at least one metal selected from the Groups VI, VII and/or VIII of the Periodic Table; and
(b) a stabilizing organic compound attached to (one of) the said metal(s) and containing at least one group capable of forming an additional, non-covalent, bond with (one of) the said metal(s).

Also disclosed are products made by the process of the invention, and novel complexes of the general formula $[LPdQ][A]_n$, wherein Q stands for 2-acylnorborn-1-yl, 2-acylnorborn-3-en-1-yl or a 2-acylethyl group, n is 0 or 1, A stands for a weakly or non-coordinating anion and, if n is 1, L stands for bidentate ligand of the general formula $R^1R^2M^1$—R—$M^2R^3R^4$, wherein $R^1$, $R^2$, $R^3$, and $R^4$ independently represent substituted or nonsubstituted hydrocarbyl groups, $M^1$ and $M^2$ independently represent phosphorus, arsenic, antimony or nitrogen and R represents a divalent organic bridging group containing at least one carbon atom in the bridge, or, if n =0, L stands for a sulfonate anion of the general formula $R^8R^9P$—$R^{10}$—$SO^-_3$ wherein $R^8$ and $R^9$ independently represent substituted or non-substituted hydrocarbyl groups and $R^{10}$ represents an organic bridging group having 1–4 carbon atoms in the bridge.

11 Claims, No Drawings

POLYMER PREPARATION

BACKGROUND OF THE INVENTION

The invention relates to a process for the preparation of copolymers of carbon monoxide with one or more compounds comprising an ethylenically unsaturated bond.

It is known that copolymers of carbon monoxide and one or more ethylenically unsaturated compounds, in which copolymers the units originating from carbon monoxide substantially alternate with the units originating from the ethylenically unsaturated compounds, may be prepared by reacting the monomers under polymerization conditions in the presence of a suitable catalyst.

These copolymers can be prepared in the liquid phase or in the gas phase. These methods are described in references exemplified by EP 181,014 (liquid phase) and EP 248,483 (gas phase). The gas phase method is preferred for technical and economic reasons. For example, with the gas phase method, isolation and purification of the product is carried out without the need for the additional steps of filtration and centrifugation.

In the known embodiments of the copolymerization process i.e. both in embodiments carried out in the liquid phase and in those carried out in the gasphase, usually a catalyst system is applied which is based on a compound of a metal from Group VIII of the Periodic Table, an anion of a non-halogenic acid with a pKa of less than 2, and a bidentate ligand. It is believed that when using such a catalyst system in a liquid phase operation of the process, polymerization will only occur when an anion originating from the liquid diluent (usually a lower alcohol such as methanol) has been incorporated in the catalyst system. It is further believed that with these catalyst systems, incorporation of a small amount of such anions in the catalyst system is required for obtaining good polymerization results.

It has accordingly been proposed to supply small amounts of a compound generating such anions during the gasphase process, in order to achieve a prolonged polymerization activity of the catalyst system. However, it will simplify the process if the use of such anion generating compounds can be omitted without impairing the polymerization results.

It has now been found that by selecting a particular catalyst system, the presence of the said anion generating compounds can be avoided. Moreover it has been observed that the copolymers thus prepared are characterized by a high degree of crystallinity.

SUMMARY OF THE INVENTION

The invention relates to a process for the preparation of copolymers which comprises reacting carbon monoxide and one or more ethylenically unsaturated compounds under polymerization conditions in the presence of a catalyst system comprising:

(a) at least one metal selected from the Groups VI, VII and/or VIII of the Periodic Table; and (b) a stabilizing organic compound attached to (one of) the said metal(s), and containing at least one group capable of forming an additional, non-covalent, bond with (one of) the said metal(s).

If desired, the process may be carried out in the presence of a non-polymerizable liquid diluent which may or may not be able to generate anions, but as has been previously disclosed, it is preferred to operate the polymerization process in the substantial absence of such diluents.

DETAILED DESCRIPTION OF THE INVENTION

According to the invention, the catalyst is, inter alia, based on one or more metals selected from the Groups VI, VII and/or VIII of the Periodic Table. These metals include chromium, molybdenum and tungsten (Group VI), manganese and rhenium (Group VII) and iron, cobalt, nickel, ruthenium, rhodium, palladium, osmium, iridium and platinum (Group VIII). They will further be indicated herein as metal(s).

Among these metals, those of Group VIII are preferred, in particular palladium, rhodium and nickel.

Catalysts based on palladium as metal are most preferred. In the catalyst system the metal may be present as a zero valent metal, or as a cation. Very suitable are catalyst systems comprising a metal, in particular palladium, as a monovalent cation, linked to one or more other components of the catalyst system.

According to the invention the catalyst system is further based on a stabilizing organic compound containing at least one group, capable of forming a non-covalent bond with a metal(s). In the present description the stabilizing organic compound will be referred to as compound (b).

Particularly suitable compounds (b) are those which in addition to a non-covalent bond with a metal(s), comprise a covalent linkage to that metal via a carbon atom.

It is considered likely that the stabilizing effect of the compound (b) is related to the absence of any hydrogen atom which is in a beta position with respect to the metal(s) and readily accessible to that metal. Furthermore, electronic factors and stearic properties may be involved in the stabilizing function of the compounds (b).

Typically such a stabilizing organic compound is selected so that upon formation of the additional non-covalent bond, a 5- or 6-membered ring is formed comprising the metal (a), the carbon atom of the stabilizing organic compound covalently bound to the metal (a) and one or more atoms of the group forming the non-covalent bond. Any other atom of the 5or 6-membered ring is an atom of the stabilizing organic compound and is preferably a carbon atom, but may also be, for example, nitrogen, silicon or germanium.

Preferred compounds (b) are usually found among the compounds comprising a cyclic moiety in their molecules. Accordingly, preference is given to compounds (b) containing a mono-, bi- or polycyclic moiety, in particular to compounds containing a mono-, or bicyclic structure. Suitable examples of such moieties are those derived from cyclopentadiene, bornene, norbornene, norbornadiene, camphene, naphthalene, styrene, indene and bicyclooctene. Also suitable are cyclic structures comprising one or more hetero atoms, such as structures derived from indole, benzopyran and pyrrole.

Examples of (more) preferred catalyst systems are systems wherein the metal is linked to a norborn-1-yl or a norborn-3-en-1-yl group of the compound (b).

Suitable groups present in the stabilizing organic compound (b) and capable of forming non-covalent bonds (NCB) with a metal(s) include atoms or groups of atoms with electron withdrawing properties.

Usually the said groups comprise an oxygen atom, for example an oxygen atom forming part of an acyl, acyloxy, alkoxy, carbonyl or a sulfonyl group.

Preferred NCB forming groups include acyl and alkoxycarbonyl groups, typically having up to 10 carbon atoms, in particular acyl groups such as acetyl, propionyl or acyloxy groups such as acetoxy and propionyloxy groups. Acetyl groups are particularly preferred NCB forming groups.

Accordingly, as regards compound(b) preferred catalyst systems are based on 2-acetylnorbornene or 2-acetylnorbornadiene which are linked to a metal via the carbon atom at position 1 and which forms a non-covalent bond with that metal via the oxygen atom of the acetyl group.

In the process according to the invention, preferably, a catalyst system is used which, in addition to the metal and compound (b), comprises one or more ligands capable of complexing with the metal.

Suitable ligands include monodentate, bidentate and polydentate ligands, as well as ligands which in addition to one or more complexing sites, comprise at least one site which can form a non-complexing bond with the metal.

Bidentate ligands are preferred, as it would appear that the presence of two complexing sites in one molecule significantly contributes to the formation of stable catalysts.

A preferred group of bidentate ligands can be indicated by the general formula $$R^1R^2M^1R\ M^2R^3R^4 \qquad (I)$$

In this formula each of $M^1$ and $M^2$ independently represents a phosphorus, arsenic, antimony or nitrogen atom, while each of $R^1$ $R^2$ $R^3$ and $R^4$ independently represents a substituted or non-substituted hydrocarbyl group and R represents a divalent organic bridging group containing at least one carbon atom in the bridge.

Other suitable bidentate ligands are for example bis thio- compounds such as 1,2-bis (ethylthio)ethane and 1,2 -bis(propylthio)ethene, mixed ligands such as 1-diphenylphosphino-3-ethylthio-propane and compounds having two nitrogen containing rings such as bipyridine and 1,10-phenanthroline.

In the ligands of formula (I) $M^1$ and $M^2$ preferably represent phosphorus atoms. $R^1 R^2 R^3$ and $R^4$ may independently represent optionally substituted alkyl, aryl, alkaryl, aralkyl or cycloalkyl groups typically having up to 15 carbon atoms. Preferably at least one of $R^1R^2$ $R^3$ and $R^4$ represents an aromatic group, in particular an aromatic group substituted with one or more polar groups.

Suitable polar groups include halogen atoms, such as fluorine and chlorine, alkoxy groups such as methoxy and ethoxy groups and alkylamino groups such as methylamino-, dimethyl amino and diethylamino groups.

If one or more of $R^1$, $R^2$ , $R^3$ and $R^4$ represents a substituted aryl group, preference is given to a phenyl-group substituted at one or both ortho positions with respect to $M^1$ or $M^2$, with an alkoxygroup, preferably a methoxy group In the ligands of formula (I), R preferably represents a divalent organic bridging group containing from 2 to 4 bridging atoms, at least two of which are carbon atoms.

Examples of suitable R groups are: $-CH_2-CH_2-$; $-CH_2-CH_2CH_2-$; $-CH_2-Si(CH_3)_2-CH_2-$; $-CH_2-C(CH_3)_2-CH_2$ and $CH_2-CH_2-CH_2-CH_2-$.

Examples of suitable groups R are: $-CH_2-CH_2-$; $CH_2CH_2-CH_2-$; $-CH_2-Si(CH_3)_2-CH_2-$; $-CH_2-C(CH_3)_2-CH_2$ and $-CH_2-CH_2-CH_2-CH_2-$.

Another preferred group of bidentate ligands can be represented by the general formula

wherein X and Y independently represent organic bridging groups, each containing 3 or 4 atoms in the bridge, at least 2 of which are carbon atoms. The bridging groups X and Y are preferably identical. Particularly suitable bidentate ligands of this type are 2,2 ' bipyridine and 1,10-phenanthroline.

Other suitable bidentate ligands are for example bis thio-compounds such as 1,2 bis (ethylthio) ethane and 1,2-bis(propylthio)-ethene and mixed ligands such as 1-diphenylphosphino-3-ethylthiopropane.

Preferred monodentate ligands may be indicated by the general formula $$R^5R^6R^7M^3 \qquad (II),$$

wherein $M^3$ represents a phosphorus, arsenic or antimony atoms and each of $R^5$, $R^6$, and $R^7$ independently represents a substituted or unsubstituted hydrocarbyl group, typically having up to 15 carbon atoms.

Preferably $M^3$ represents a phosphorus atom. $R^5$, $R^6$, and $R^7$ are preferably phenyl groups.

Other preferred monodentate ligands may be indicated by the general formula $R^8R^9P-R^{10}-SO^-_3$ wherein $R^8$ and $R^9$ independently represent substituted or non-substituted hydrocarbyl groups, typically having up to 15 carbon atoms, and $R^{10}$ represents an organic bridging group having 1–4 carbon atoms in the bridge. These monodentate ligands carry a negative charge which may compensate for a positive charge of a metal (a), if there is any. It is preferred to use an aromatic sulfonate of which the groups $R^8$ and $R^9$ are identical. If the groups $R^8$ and $R^9$ are substituted aryl groups they are preferably alkoxy substituted, the substitution typically being ortho with respect to the phosphorus atom. Very suitable ligands of this kind are 2-(dicyclohexylphosphino)benzene-sulfonate or 2-(diphenylphosphino)benzene-sulfonate.

The preparation of the inventive catalyst systems can be accomplished by methods known in the art. Reference is made in particular to the preparation methods described in Organometallics, Vol 9, No.6 (1990) pages 1736-1739 and in Journal of Organometallic Chemistry, 424 (1992) C12-C16.

The catalyst systems of the invention include compositions which are novel.

As novel compositions are claimed complexes of the general formula $$[LPdQ][A]_n \qquad (III)$$

wherein Q stands for 2-acylnorborn-1-yl, 2-acylnorborn-3-en-1-yl or a 2-actylethyl group, n is 0 or 1, A stands for a weakly or non-coordinating anion and, if n is 1, L stands for a bidentate ligand of the general formula $R^1R^2R^1-R-M^2R^3R^4$ wherein $R^1$, $R^2$, $R^3$, and $R^4$ independently represent substituted or non-substituted hydrocarbyl groups, $M^1$ and $M^2$ independently represent phosphorus, arsenic, antimony or nitrogen and R represents a divalent organic bridging group containing at least one carbon atom in the bridge, or, if n =0, L stands for a sulfonate anion of the general formula $R^8R^9P-R^{10}-SO^{13}{}_3$ wherein $R^8$ and $R^9$ independently represent substituted or non-substituted hydrocarbyl groups and $R^{10}$ represents an organic bridging group having 1-4 carbon atoms in the bridge. Preferred complexes are those in which the acyl group of Q is an acetyl group. Preferred ligands L are 1,3-bis(diphenylphosphino)propane and 1,3-bis[bis(2-methoxyphenyl)phosphino]propane (n is 1) or 2-(dicyclohexylphosphino)benzenesulfonate and 2-(diphenylphosphino)benzenesulfonate (n is 0). Preferred weakly or non-coordinating anions are as defined hereinbefore.

The amount of catalyst used in the copolymerization process of the invention may vary between wide limits. Generally the amount of catalyst is in the range of from about $10^{-8}$ to $10^{-2}$ gram atom of metal per molecule of ethylenically unsaturated compound to be copolymerized. Preferably, the amount of catalyst used is in the range of from about $10^{-7}$ to $10^{-3}$ gram atom of metal per molecule of ethylenically unsaturated compound.

If desired, a catalyst system may be used which is supported on a carrier, usually in order to facilitate the introduction of the catalyst system into the reactor. Suitable carrier materials may be inorganic, such as silica, alumina or charcoal or organic, such as cellulose or dextrose. Furthermore, as carrier material a polymer may be used, for example polyethylene, polypropylene, polystyrene or a copolymer of carbonmonoxide with an ethylenically unsaturated compound such as the copolymers made by the process of the invention.

Ethylenically unsaturated compounds suitable to be used as starting material in the copolymerization process of the invention include compounds consisting exclusively of carbon and hydrogen and compounds which in addition comprise one or more hetero-atoms, such as unsaturated esters. Unsaturated hydrocarbons are preferred. Suitable examples are lower olefins such as ethene, propene and 1-butene; cyclic compounds such as cyclopentene and aromatic compounds such as styrene and alphamethyl styrene. Preference is given to the use of ethene, propene or a mixture of ethene and propene.

The molar ratio between the monomers, viz. carbon monoxide and the ethylenically unsaturated compound(s), is generally in the range of from about 5:1 to 1:5. Preferably the said molar ratio is in the range of from about 1.5:1 to 1:1.5 and most preferably the monomers are used in substantially equimolar amounts.

The process of the invention is advantageously carried out in the further presence of a chain-transfer agent. Preferably a gaseous chain-transfer agent, particularly hydrogen, is used. The chain-transfer agent may be applied in admixture with the monomers used as starting material, or can be supplied separately, for example, shortly after the copolymerization reaction has started.

The preparation of the copolymers is preferably carried out at a temperature in the range of from about 20°-200° C., although the use of a reaction temperature outside that range is not precluded. Preferably the reaction temperature is in the range of from about 25°-120° C.

Suitable pressures generally are within the range of from about 1-200 bar, but preferably the pressure is in the range of from about 10-100 bar.

The higher the molecular weight of the copolymers according to the invention, the higher will be in general the intrinsic viscosity they exhibit. For the determination of the intrinsic viscosity (sometimes referred to as Limiting Viscosity Number (LVN)) of a copolymer according to the invention, four solutions are prepared by dissolving the copolymer in four different concentrations at 100° C. in m-cresol. For each of these solutions, the viscosity is measured in a viscometer at 100° C. relative to m-cresol at 100° C.

If $T_o$ represents the outflow time of m-cresol and $T_p$ the outflow time of the polymer solution, the relative viscosity ($g_{rel}$) is obtained from $g_{rel} = T_o/T_p$. From $g_{rel}$ the inherent viscosity ($g_{inh}$) can be calculated according to the formula:

$$g_{inh} = \frac{\ln \eta_{rel}}{c}$$

where c represents the concentration of the copolymer in grams per 100 ml solution. By plotting graphically the $g_{inh}$ for each of the four solutions against the corresponding concentration (c) and then by extrapolating to c=0, the intrinsic viscosity [g]in dl/g is found. The copolymers of this invention generally have an LVN of between 0.2 and 4.0 dl/g. Preferred copolymers have an LVN of between 0.3 and 3 dl/g.

The copolymers of this invention have a high crystallinity and exhibit good mechanical properties. They may be processed by means of conventional techniques into films, sheets, plates, fibers, shaped articles and the like. The copolymers with a relatively low molecular weight are suitable for use as intermediates for the production of plastics, as blending components and as plasticizers for other polymers.

The copolymers with high molecular weight are suitable as premium thermoplastics for fibers or films, or for injection molding, compression moulding or blowing applications. These high molecular weight copolymers may be used for many applications, such as in the car industry, for the manufacturing of packaging materials for foods and drinks, as construction and building material, as insulating material in the production of cables and for various applications in the domestic sphere.

The invention will further be illustrated by the following non-limiting examples.

EXAMPLE 1

A complex of the formula [Pd($C_7H_{10}$ CO Me)(PPh$_3$)$_2$](BF4) wherein $C_7H_{10}$ CO Me stands for 2-acetyl-norborn-1-yl and PPh$_3$ for triphenylphosphine, was placed in an autoclave as a dry solid (2.8 mg Pd).

The autoclave had been previously heated to 110° C. for 2 hours and then cooled under a stream of nitrogen to ensure minimal residual water.

The autoclave was then adequately flushed with CO before being pressurized to 20 bar with CO and an additional 20 bar with ethene (total pressure 40 bar).

Subsequently the autoclave was heated such that the internal temperature was 43° C.

After 18 hours the autoclave was cooled to room temperature and depressurized. It contained 135 mg of a homogeneous salmon-colored powder.

The rate of polymer production was found to be 2.7 g polymer/g Pd.h.

EXAMPLE 2

A carbon monoxide/ethylene copolymer was prepared substantially following the procedures of Example 1, except for the following differences:

a. 13.8 mg was used of a complex of the formula [LPd($C_7H_{10}COCH_3$)]($BF_4$) (containing 1.7 mg palladium), wherein L stands for 1,3-bis[bis(2-methoxyphenyl)phosphino]propane and $C_7H_{10}COCH_3$ for 2-acetylnorborn-1-yl, instead of the complex of the formula [Pd($C_7H_{10}COCH_3$)($PPh_3$)$_2$]($BF_4$), b. the polymerization temperature was 100° C. instead of 43° C., and c. the reaction time was 1 hour instead of 18 hours.

The yield of polymer was 0.34 g

EXAMPLE 3

A carbon monoxide/ethylene copolymer was prepared substantially following the procedures of Example 1, except for the following differences:

a. 8.2 mg was used of a complex of the formula [LPd($C_7H_{10}COCH_3$)]($BF_4$), and b. the polymerization temperature was 100° C. instead of 43° C.

The yield of polymer was 0.9 g.

EXAMPLE 4

The procedures of Example 1 were substantially repeated, except for the following differences:

a. 35.7 g was used of a complex of the formula LLPd)($CH_3COO$)$_2$ (containing 5 mg palladium), wherein L stands for 1,3 bis[bis-(2-methoxyphenyl)phosphino]propane, instead of the complex of the formula [Pd($C_7H_{10}COCH_3$)($PPh_3$)$_2$]($BF_4$), b. the polymerization temperature was 100° C. instead of 43° C., and c. the reaction time was 3 hours instead of 18 hours.

The polymer yield was negligible.

EXAMPLES 5-9

In Examples 5-9 a complex was used which was impregnated onto 5.0 g of a carrier prior to the introduction into the autoclave. The carrier was a carbon monoxide/ethene/propene terpolymer obtained by combining palladium acetate, 1,3-bis[bis(2-methoxyphenyl)phosphino] propane and trifluoroacetic acid. The impregnation was effected by evenly distributing a solution of the complex to be used in 3 ml dichloromethane over 5 g of the carrier and drying the mixture obtained in nitrogen at 50° C. over 30 minutes.

EXAMPLE 5

A carbon monoxide/ethylene copolymer was prepared substantially following the procedures of Example 1, except for the following differences:

a. 15.0 mg was used of a complex of the formula [LPd($C_7H_{10}COCH_3$)]($BF_4$) (containing 5.0 mg palladium), wherein L stands for 1,3-bis(diphenylphosphino)propane and $C_7H_{10}COCH_3$ for 2-acetylnorborn-1-yl, instead of the complex of the formula [Pd($C_7H_{10}COCH_3$)($PPh_3$)$_2$]($BF_4$), b. prior to introduction into the autoclave the complex was impregnated onto a carrier, c. the polymerization temperature was 100° C. instead of 43° C., and d. the reaction time was 1 hour instead of 18 hours.

The quantity of polymer prepared was 2.5 g.

EXAMPLE 6

A carbon monoxide/ethylene copolymer was prepared substantially following the procedures of Example 1, except for the following differences:

a. 17.2 mg was used of a complex of the formula LPd($C_7H_{10}COCH_3$) (containing 3.0 mg palladium), wherein L stands for 2-(diphenylphosphino)benzenesulfonate and $C_7H_{10}COCH_3$ for 2-acethylnorborn-1-yl, instead of the complex of the formula [Pd($C_7H_{10}COCH_3$)($PPh_3$)$_2$]($BF4$), b. prior to introduction into the autoclave the complex was impregnated onto a carrier, c. the polymerization temperature was 100° C. instead of 43° C., and d. the reaction time was 1 hour instead of 18 hours.

The quantity of polymer prepared was 1.0 g.

EXAMPLE 7

A carbon monoxide/ethylene copolymer was prepared substantially following the procedures of Example 1, except for the following differences:

a. 19.0 mg was used of a complex of the formula LPd($ch_2CH_2COCH_3$) (containing 4.0 mg palladium), wherein L stands for 2-(diphenylphosphino)benzenesulfonate, instead of the complex of the formula [Pd($C_7H_{10}COCH_3$)($PPh_3$)$_2$]($BF_4$), b. prior to introduction into the autoclave the complex was impregnated onto a carrier, c. the polymerization temperature was 100° C. instead of 43° C., and d. the reaction time was 1 hour instead of 18 hours.

The quantity of polymer prepared was 0.53 g.

EXAMPLE 8

A carbon monoxide/ethylene copolymer was prepared substantially following the procedures of Example 1, except for the following differences:

a. 20.65 mg was used of a complex of the formula LPd($C_7H_{10}COCH_3$) containing 4.0 mg palladium), wherein L stands for 1-(dicyclohexylphosphino)benzenesulfonate and $C_7$($PPh_3$)$_2$]($BF_4$, $H_{10}COCH_3$ for 2-acetylnorborn-1-yl, instead of the complex of the formula [Pd($C_7H_{10}COCH_3$) ($PPh_3$)$_2$]($BF_4$), b. prior to introduction into the autoclave the complex was impregnated onto a carrier, c. the polymerization temperature was 100° C. instead of 43° C., and d. the reaction time was 1 hour instead of 18 hours.

The quantity of polymer prepared was 0.11 g.

EXAMPLE 9

A carbon monoxide/ethylene copolymer was prepared substantially following the procedures of Example 1, except for the following differences:

a. 27.0 mg was used of a complex of the formula [LPd($C_7H_{10}COCH_3$)]($BF_4$) (containing 4.0 mg palladium), wherein L stands for 1,3-bis(diphenylphosphino propane and $C_7H_{10}COCH_3$ for 2-acethylnorborn-1-yl, instead of the complex of the formula [Pd($C_7H_{10}COCH_3$)($PPh_3$)$_2$]($BF_4$), b. prior to introduction into the autoclave the complex was impregnated onto a carrier, c. 5 bar hydrogen was present in addition to carbon monoxide and ethene, d. the polymerization temperature was 80° C. instead of 43° C., and e. the reaction time was 1 hour instead of 18 hours.

The quantity of polymer prepared was 1.2 g.

With the aid of $^{13}C$ NMR analysis it was established that the products obtained in Examples 1 and 2 are polymers substantially consisting of linear chains in which units derived from carbon monoxide are alternating with units derived from ethene.

This invention has been described in detail for the purpose of illustration, and it is not to be construed as limited thereby but is intended to cover all changes and modifications within the spirit and scope thereof.

What is claimed is:

1. A process for the preparation of copolymers which comprises reacting carbon monoxide and one or more ethylenically unsaturated compounds under polymerization conditions in the presence of a catalyst system comprising:

at least one metal selected from the Groups Vi, VII or VIII of the Periodic Table attached to a stabilizing organic compound by a covalent bond via a carbon atom to said metal and containing at least one group capable of forming an additional non-covalent bond with said metal(s).

2. A process as in claim 1 comprising reacting in the substantial absence of a nonpolymerizable liquid diluent.

3. A process as in claim 1 wherein said Group VIII metal is palladium.

4. A process as in claim 1 wherein the compound comprising the additional non-covlanet bond is a 5- or 6-membered ring compound comprising the said metal(s), the said carbon atom and one or more atoms of the group forming the additional non-covalent bond, any other atoms of the 5- or 6-membered ring being atoms of the stabilizing organic compound.

5. A process as in claim 1 wherein said stabilizing organic compound does not contain any hydrogen atom in a beta position with respect to said metal(s) that is readily accessible to said metal(s).

6. A process as in claim 1 wherein said stabilizing organic compound is an ethyl, a norborn-1-yl, or a norborn-3-en-1-yl compound.

7. A process as in claim 1 wherein said stabilizing organic compound is, 2-acetyl norbornene, or 2-acetyl norbornadiene.

8. A process as in claim 1 wherein in said stabilizing organic compound at least one of the non-covalent bond (NCB) forming groups is an acyl group.

9. A process as in claim 1 wherein said ethylenically unsaturated compound is a hydrocarbon selected from the group consisting of ethene, propene, or mixtures thereof.

10. A process as in claim 1 wherein:

(a) said metal(s) are present in an amount of from about $10^{-7}$ to $10^{-3}$ gram atom per molecule of ethylenicaly unsaturated compound to be copolymerized;

(b) the molar ratio between carbon monoxide and the ethylenically unsaturated compound(s) is in the range of from about 1.5:1 to 1:1.5; and (c) said polymerization is at a temperature of from about 20° to 200° C., and at a pressure of from about 1–200 bars.

11. A copolymer having and exhibiting a high degree of crystallinity prepared by the process of claim 1.

* * * * *